United States Patent [19]
Kucera et al.

[11] Patent Number: 5,806,953
[45] Date of Patent: Sep. 15, 1998

[54] PROJECTOR TRANSPORTER

[75] Inventors: Paul Kucera, Streetsville; George Skvortsoff, Etobicoke, both of Canada

[73] Assignee: Imax Corporation, Mississauga, Canada

[21] Appl. No.: 807,924

[22] Filed: Feb. 28, 1997

[51] Int. Cl.$^6$ ................................................ G03B 21/14
[52] U.S. Cl. ........................................ 353/122; 352/243
[58] Field of Search ................................. 353/119, 122, 353/7; 352/243, 242, 57, 58, 59, 60, 133; 359/462, 473

[56] References Cited

U.S. PATENT DOCUMENTS 5,648,878  7/1997  Park ............................................ 353/94

Primary Examiner—William Dowling
Attorney, Agent, or Firm—Bereskin & Parr

[57] ABSTRACT

A 3-D film projection apparatus includes two projectors that are disposed side-by-side in closely adjacent positions during projection. Each projector is carried by a transporter so that it can be moved to a retracted position rearwardly and laterally outwardly with respect to the other projector for providing access to the projector for set up and maintenance. Preferably, the transporters are motorized and the apparatus includes film guide means for maintaining a film path between each projector and an associated reel unit during transportation of the projector between its projection position and its retracted position.

10 Claims, 7 Drawing Sheets

PROJECTOR TRANSPORTER

FIELD OF THE INVENTION

This invention relates to an image projection apparatus than includes two projectors, for example 3-D film projectors.

BACKGROUND OF THE INVENTION

3-D motion pictures generally are made by simultaneously filming a subject using two motion picture cameras positioned to provide "left eye" "right eye" views of the subject corresponding to the views that would be seen by left and right eyes of a human viewer. To present the motion picture, the images recorded by the cameras are simultaneously projected onto a screen and are optically coded so that the left eye of a viewer sees only the images that were recorded by the "left eye" camera while the viewer's right eye sees only the "right eye" images. The viewer then perceives a stereoscopic or 3-D effect.

In a typical IMAX(™) 3-D system, the left eye and right eye images are projected alternately and the viewer wears glasses having lenses that comprise electro-optic shutters. The shutters are triggered in timed relation to the projection of images so that the viewer's left eye is blocked when the right eye images appear and the viewer's right eye is blocked when the left eye images appear.

In order to achieve a realistic 3-D effect, it is necessary that the images be projected through projection lenses that are offset laterally from one another by an amount that corresponds as closely as possible to the spacing between a viewer's eyes (the interocular distance). A typical interocular distance is about 4 inches.

U.S. Pat. No. 4,966,454 (Toporkiewicz) discloses a single projector that is capable simultaneously projecting images from two film strips. In other words only one projector is used to project both the left eye and the right eye images. More usually, however, two projectors are used and are positioned side by side with their projection lenses as close together as possible. While it is generally not possible to space the projection lenses at the interocular distance, at least where the projectors are so called "rolling loop" projectors of the type used in IMAX(™) theatres, it is possible to achieve a realistic stereoscopic effect by appropriate orientation of the projectors, for example so that the optical axes along which the images are projected converge slightly.

In a typical projection room in a theatre, space is at a premium. Positioning two projectors closely adjacent one another severely restricts access to the projectors for set up and maintenance purposes. Usually, the projectors will also be close to an end wall of the projection room, which further hampers access.

An object of the present invention is to provide an image projection apparatus which addresses these problems.

SUMMARY OF THE INVENTION

In accordance with the invention there is provided an image projection apparatus which includes first and second projectors disposed in adjacent side-by-side projection positions for projecting respective sets of images along generally parallel optical axes. Transport means is provided in association with at least a first one of the projectors and supports the projector for movement along a transport path between its said projection position and a retracted position clear of the second projector for permitting access to both projectors for maintenance and set up. The transport path is angled rearwardly and outwardly with respect to the second projector so that the first projector moves rearwardly from its projection position and laterally away from the second projector as it moves to its retracted position. In this context, "rearwardly" means in a direction away from the direction in which the images are projected.

In some situations, it may be sufficient if only one of the projectors can be transported in this fashion. Preferably, however, both projectors are provided with transport means and the transport paths of the two projectors diverge rearwardly from the projection positions to the retracted positions for the two projectors. In other words, the projectors can be moved apart and away from a projection window in the end wall of the projection room, allowing substantially unrestricted access to both projectors for maintenance and set up.

While various forms of transport means could be used, it is preferred to use a wheeled base which supports the projector, and which is movable on track means extending between the projection position and a retracted position for the relevant projector and defining the said transport path. The base could be movable manually on the track means. Preferably, however, powered drive means is provided for moving the base along the track.

Preferably, the track means includes at least one rail and the drive means is a driving wheel which engages that rail and a motor on the base for driving the wheel. The projector may be adjustably mounted on the base for appropriate set up of the orientation of the optical axis of the projector, in the theatre. This also allows the same base to be used in different theatres.

The invention has been developed primarily for use in the field of motion picture film projectors, although it may find application in other fields, for example, electronic projectors or even slide projectors. Where the projectors are film projectors, at least one reel unit normally will be associated with each projector for supplying film to the projector and receiving film back from the projector. In this case, the apparatus will also include film guide means for maintaining a film path between the projector and its associated reel unit or units during movement of the projector between its projection position and its retracted position.

BRIEF DESCRIPTION OF DRAWINGS

In order that the invention may be more clearly understood, reference will now be made to the accompanying drawings which illustrate particular preferred embodiments of the invention by way of example, and in which.

DESCRIPTION OF PREFERRED EMBODIMENTS

Figure 1:
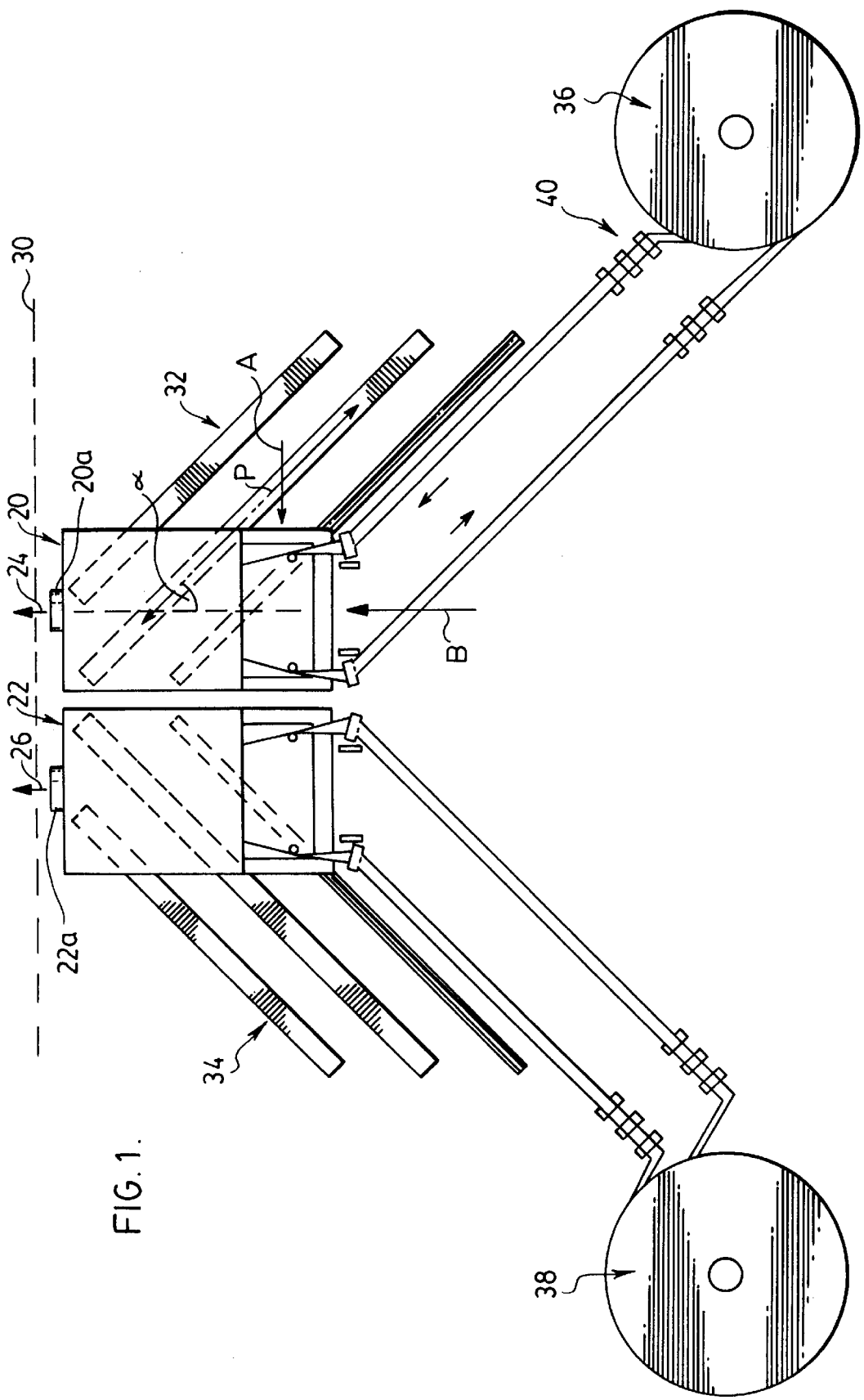
FIG. 1 is a diagrammatic plan view of a film projection apparatus in accordance with the invention.

Referring first to FIG. 1, a 3-D film projection apparatus is shown to comprise first and second film projectors denoted respectively 20 and 22. The projectors are shown in respective projection positions in which they are disposed side-by-side and as close to one another as possible for projecting images along respective optical axes 24 and 26. The projectors themselves may be of any form known in the art. Preferably, however, the projectors are rolling loop film projectors of the form disclosed in U.S. Pat. No. 5,587,750 issued Dec. 24, 1996 (Gibbon et al.). The disclosure of this patent is incorporated herein by reference. It should be understood, however, that other types of projectors can be used within the context of the present invention.

For the purpose of the present disclosure, the two projectors 20 and 22 are shown in outline form only. Respective projection lenses are indicated at 20a and 22a. In a theatre, the projectors will be positioned with the lenses 20a and 22a behind a window in an end wall of a projection room, for projecting images through that window and into the auditorium of the theatre. The end wall of the projection room is indicated in ghost outline at 30 in FIG. 1.

According to the present invention at least one of the two projectors 20, 22 is provided with transport means supporting the projector from movement along a transport path P between the projection position shown and a retracted position clear of the other projector. In the illustrated embodiment, both of the projectors 20, 22 are provided with transport means that are essentially identical but mirror images of one another. Accordingly, in the following description, only the transport means for projector 20 will be described in detail. Nevertheless, FIGS. 1, 2 and 3 do show the general configuration of the transport means for both projectors.

Figure 3:
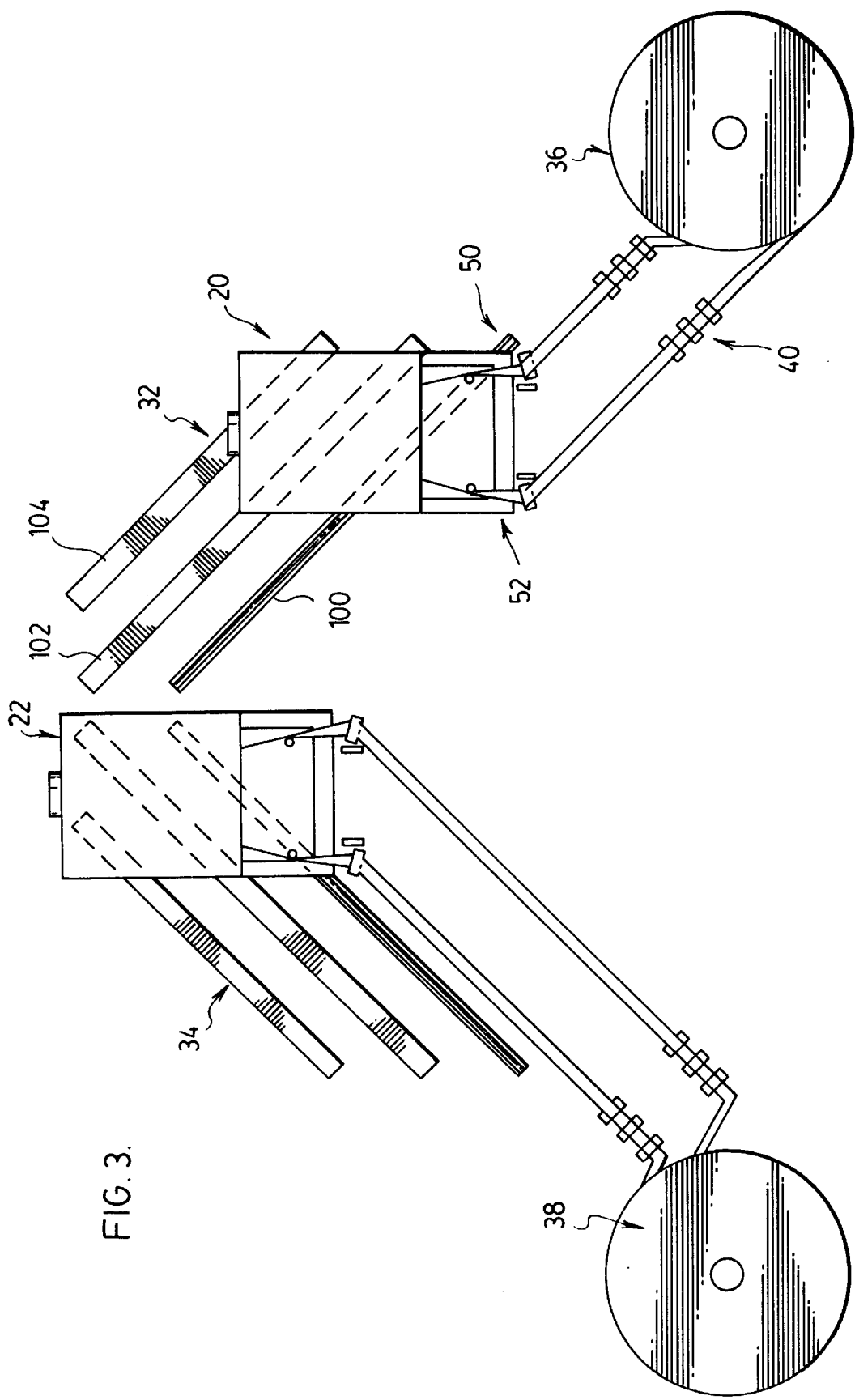
FIG. 3 is a view similar to FIG. 1 showing one of the projectors in a retracted position.

Each projector is supported on a series of tracks generally indicated at 32 and 34 respectively. The tracks diverge rearwardly away from the direction in which the images are projected. In FIG. 3, projector 20 is shown in its retracted position, while projector 22 is in its projection position. The transporters for the two projectors are independent so that either or both projectors can be retracted at any time, for example, depending on whether only one or both of the projectors requires maintenance or set up. In any event, it will be appreciated that movement of a particular projector to its retracted position allows substantially unrestricted access to at least the retracted projector and that even greater access is provided if both projectors are retracted at the same time. Each projector can be run both in the projection position and in the retracted position.

In the illustrated embodiment, the two sets of tracks 32 and 34 are orientated with respect to the optical axes 24 and 26 respectively at an angle $\alpha$ of approximately 45°, as is indicated in FIG. 1 for track set 32. This angle is not believed critical and could be different for the two projectors. In general, it may be that an angle of approximately 30° is preferred in view of other space limitations in a typical projection room. A 30° angle may represent a suitable compromise between allowing reasonable access to both projectors while not occupying too much surrounding space in the projection room.

Figure 2:
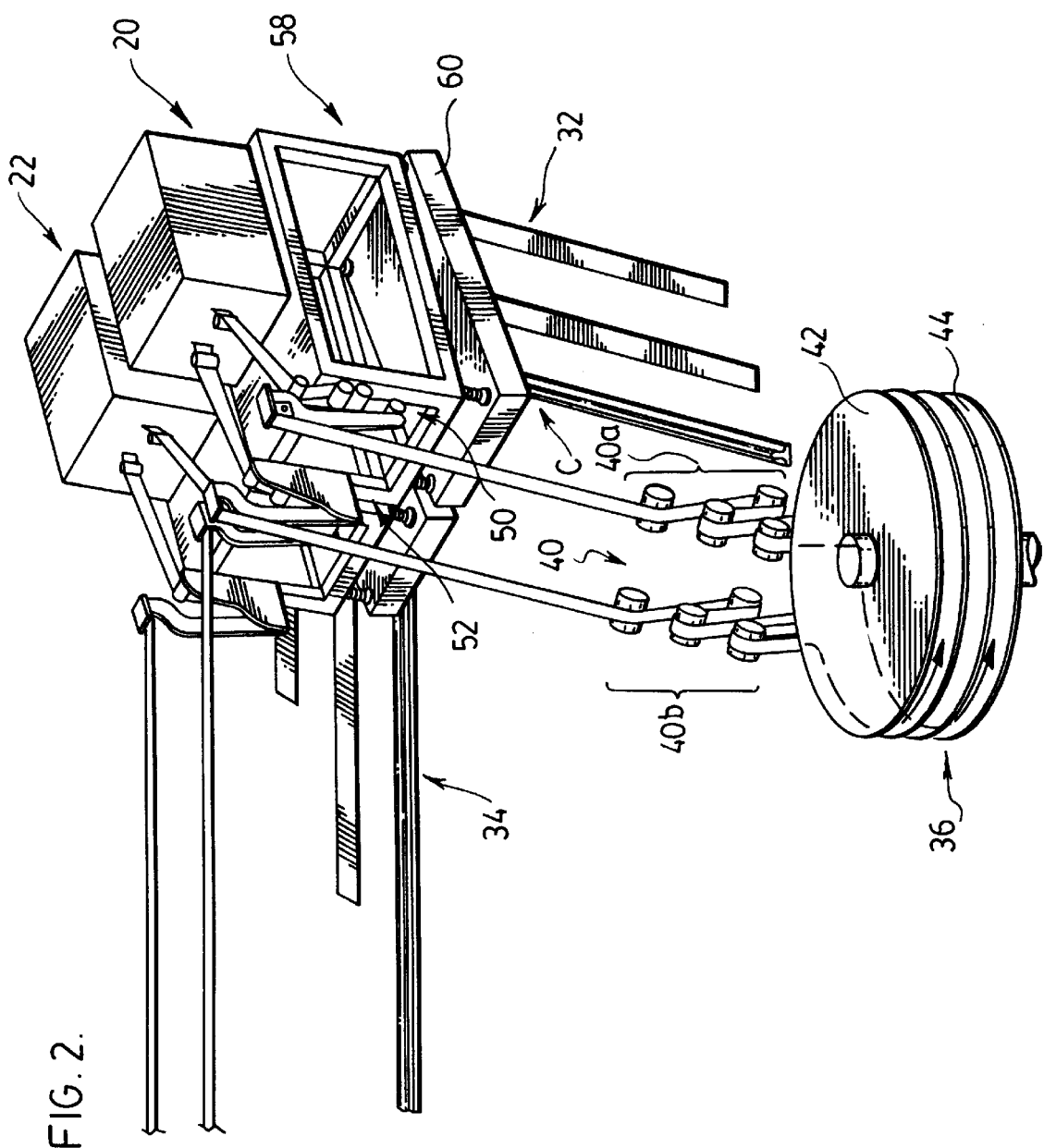
FIG. 2 is perspective view from below and to the right in FIG. 1.

FIGS. 1, 2 and 3 show respective film reel units 36 and 38 that are used in association with the projectors and that must be accommodated within the projection room. As indicated previously, the apparatus provided by the invention also includes film guide means (to be described) for maintaining a film path between each projector and the associated reel unit during movement of that projector between its projection position and its retracted position. This is illustrated in FIG. 3 in the case of projector 20; it will be seen that the film path to and from reel unit 36 has been maintained even though the projector has been retracted. Again, the film guide means for the two projectors are essentially identical and therefore will be described with reference to projector 20 only.

Referring first to FIG. 2, it should be noted that the reel unit is essentially well known, as is an associated film tensioner unit which is generally indicated at 40. Accordingly, neither the reel unit nor the tensioner unit will be described in detail. It is sufficient to note that the reel unit 36 includes a film supply platter 42 and film take up platter 44 (though separate supply and take-up reel units could be used). Film from platter 42 passes around a first series of tensioner rollers 40a of unit 40 and then to a film input roller assembly 50, which is shown in more detail in FIGS. 4 and 5, before entering the projector. The film then returns through an output roller assembly 52 and into a second series of tensioner rollers 40b of unit 40, and back to the take up platter 44. An identical, but mirror image film guide arrangement is provided between projector 22 and reel unit 38.

Figure 4:
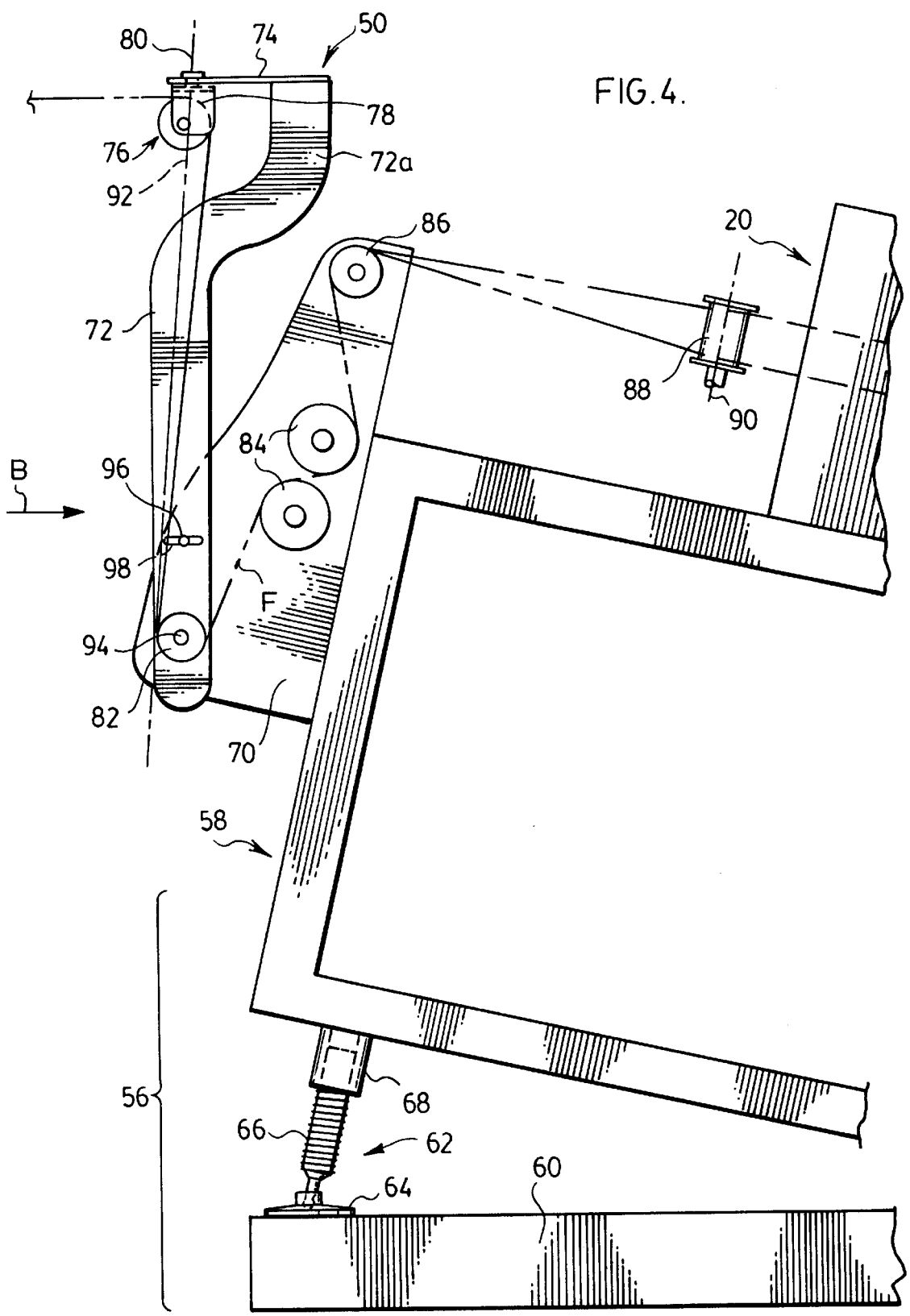
FIG. 4 is a detailed elevational view in the direction of arrow A in FIG. 1.
Figure 5:
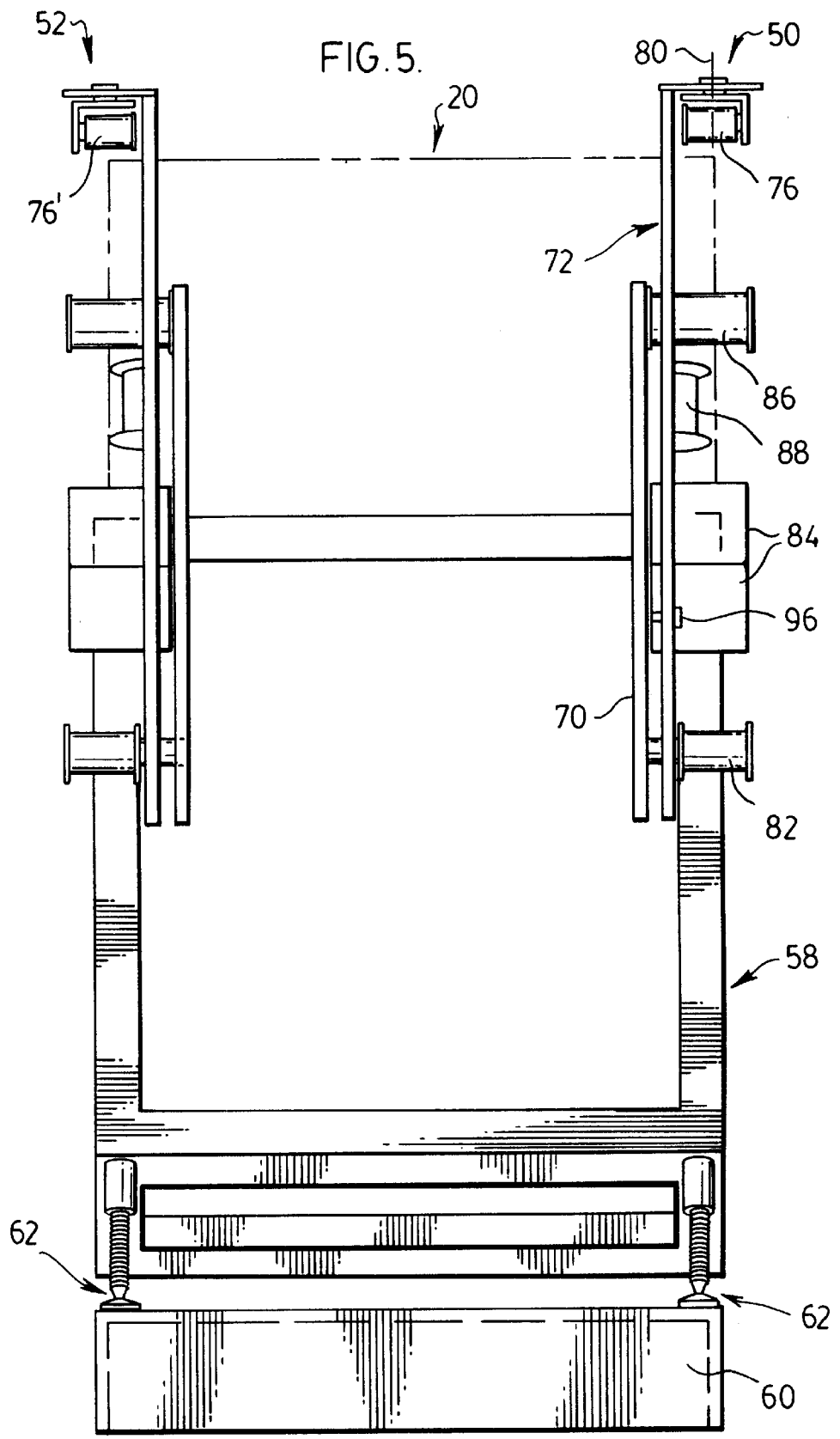
FIG. 5 is a partial elevational view in the direction of arrow B in FIG. 1.

Referring now to FIGS. 4 and 5, it will be seen that projector 20 is supported on a base 56 which comprises a frame 58 on which the projector is directly mounted, and a platform 60 below the frame. It can be seen from FIGS. 6 and 7 that the platform 60 is rectangular as seen in plan, as is frame 58. Each of the rear corners of frame 58 is provided with an adjustable levelling pad, one of which is shown at 62 in FIG. 4, and a similar pad (not shown) is provided intermediate the front corners of the frame. Pad 62 essentially comprises a foot 64 and screw threaded shaft 66 that is pivotally mounted in and extends upwardly from the foot and is received in a complimentarily internally screw threaded collar 68 on frame 58. These three levelling pads allow angular adjustment of the projector with respect to the platform 60. In a typical IMAX (™) 3-D theatre, the projectors are required to be oriented with their projection axes extending downwardly from the horizontal when the projectors are in their projection positions. This is due to overall theatre design considerations. In any event, the levelling pads 62 allow the projector to be set up in the required orientation with respect to the horizontal, and for that orientation to be maintained as the projector is moved between its projection position and its retracted position.

FIG. 4 shows the input roller assembly 50 which was referred to previously in connection with FIG. 2. The output roller assembly 52 is identical but again a mirror image, and therefore has not been shown in detail. FIG. 5 shows the two roller assemblies 50 and 52 as seen from the left in FIG. 4 (in the direction of arrow B, also seen in FIG. 1).

Bolted to frame 58 is a support plate 70 which carries a generally upright arm 72 having a forwardly curved upper end portion 72a. A bracket 74 extends rearwardly of the projector from the top of arm 72 and carries at its outer end a "leading" roller 76 that generally overhangs the lower portion of arm 72. As seen in FIG. 5, roller 76 is carried by a bracket 78 that is freely pivotable with respect to bracket 74 about an upright axis denoted 80. Film approaching the projector from the reel unit 36 travels around roller 76 and then vertically downwardly to a further roller 82 adjacent the lower end of arm 72. The film then travels upwardly and around a pair of particle transfer rollers 84, to an upper roller 86 from which the film then travels horizontally toward the projector, via a further roller 88 that is rotatable about a vertical axis 90. The film is of course required to turn through 90° between roller 86 and roller 88. The film then enters the rolling loop projector in the required orientation, namely a vertical plane.

The two particle transfer rollers 84 are of a type well known in the art and essentially are rollers that have tacky surface coverings for removing foreign particles from the film before it enters the projector.

Roller 76 at the upper end of arm 72 is free to turn about axis 80 to accommodate changes in the "approach" angle of the film as the projector is moved between its projection position and its retracted position. Preferably, roller 76 and the corresponding roller of output roller assembly 52 (76'— see FIG. 5) are at different heights so that the two runs of film will not tangle if they should cross as either projector moves between its projection position and its retracted position.

Returning to FIG. 4, it has been found important in terms of preventing unwanted twists of or kinks in the film as it travels to and from the reel unit for the upright axis of turning (80) for roller 76 to be vertical and coincident with the centre line of the film as it approaches (or leaves) the roller 82 at the bottom of arm 72, i.e. that a line joining these two points should be vertical. This line is indicated at 92 in FIG. 4. Accordingly, arm 72 is pivoted to plate 70 at a point (denoted 94) coincident with the axis of rotation of roller 82, and the arm can be clamped to plate 70 by a bolt 96 that extends through an elongated opening 98 in plate 72. This allows the orientation of the arm 72 to be set precisely irrespective of the angular orientation of the projector on platform 60.

Figure 6:
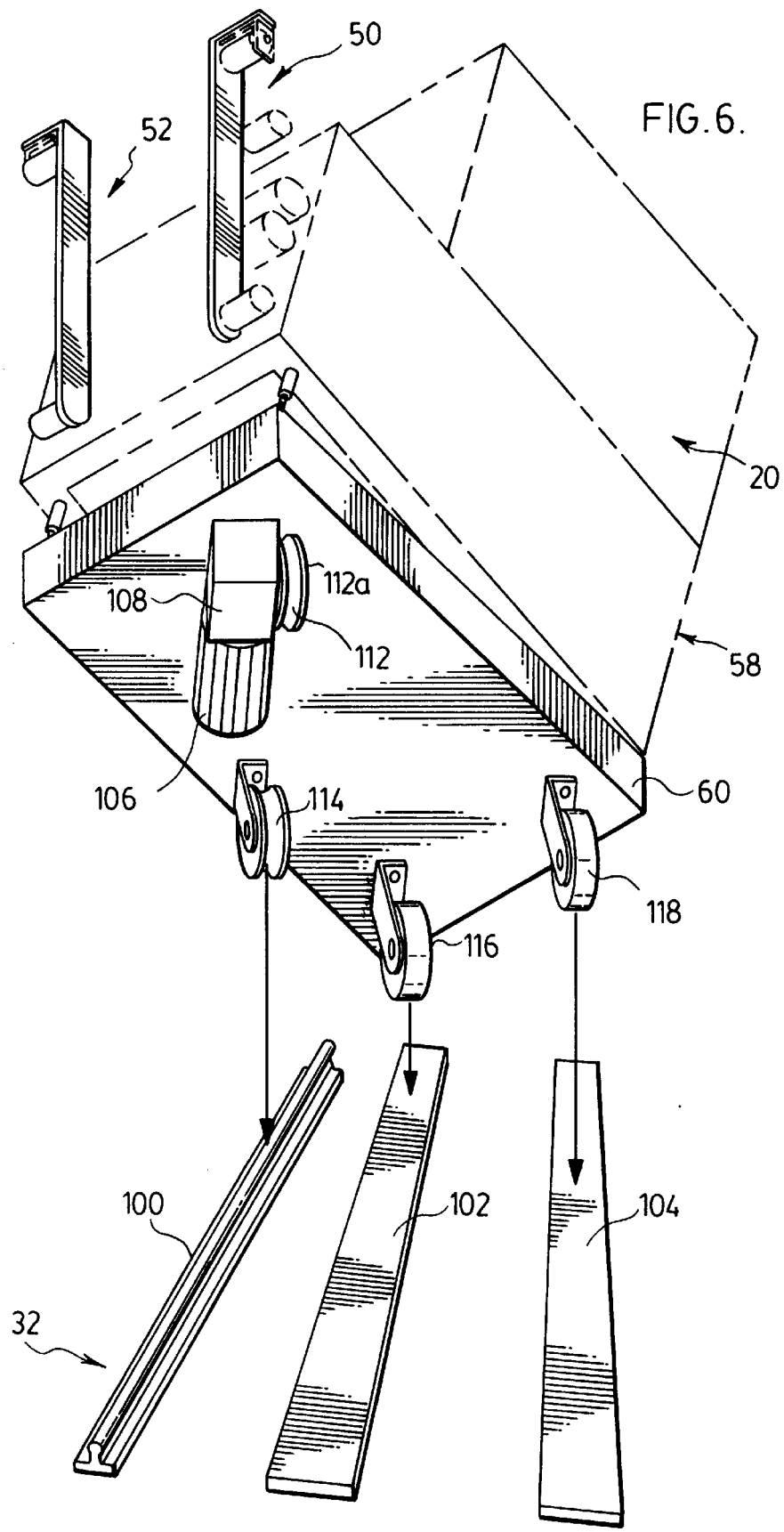
FIG. 6 is an exploded perspective view generally in the direction of arrow C in FIG. 2.

FIG. 6 shows the platform 60 as seen from below, and in association with the track means 32 on which the projector can be moved from its projection position to its retracted position. The track means includes a rail 100 having a profile similar to a railway rail, and two flat metal plates 102, 104. As seen in FIGS. 1, 2, and 3, the rail 100 and the two plates 102 and 104 extend parallel to one another and define the transport path referred to previously. Platform 60 carries an electric drive motor 106 which drives a gearbox 108. A double flanged drive wheel 112 is mounted on an output shaft (not shown) of the gearbox and rides on rail 100, for driving the projector base and projector along the rail. Platform 60 also carries a double flanged caster (non-driven) wheel 114 which also rides on rail 100. Two other plain caster wheels 116 and 118 that simply run on the respective plates 102 and 104.

Appropriate power supplies and control equipment will also of course be provided for motor 106 so that the motor can be operated under the control of a projectionist or service technician to move the projector as is required by the particular circumstances.

Figure 7:
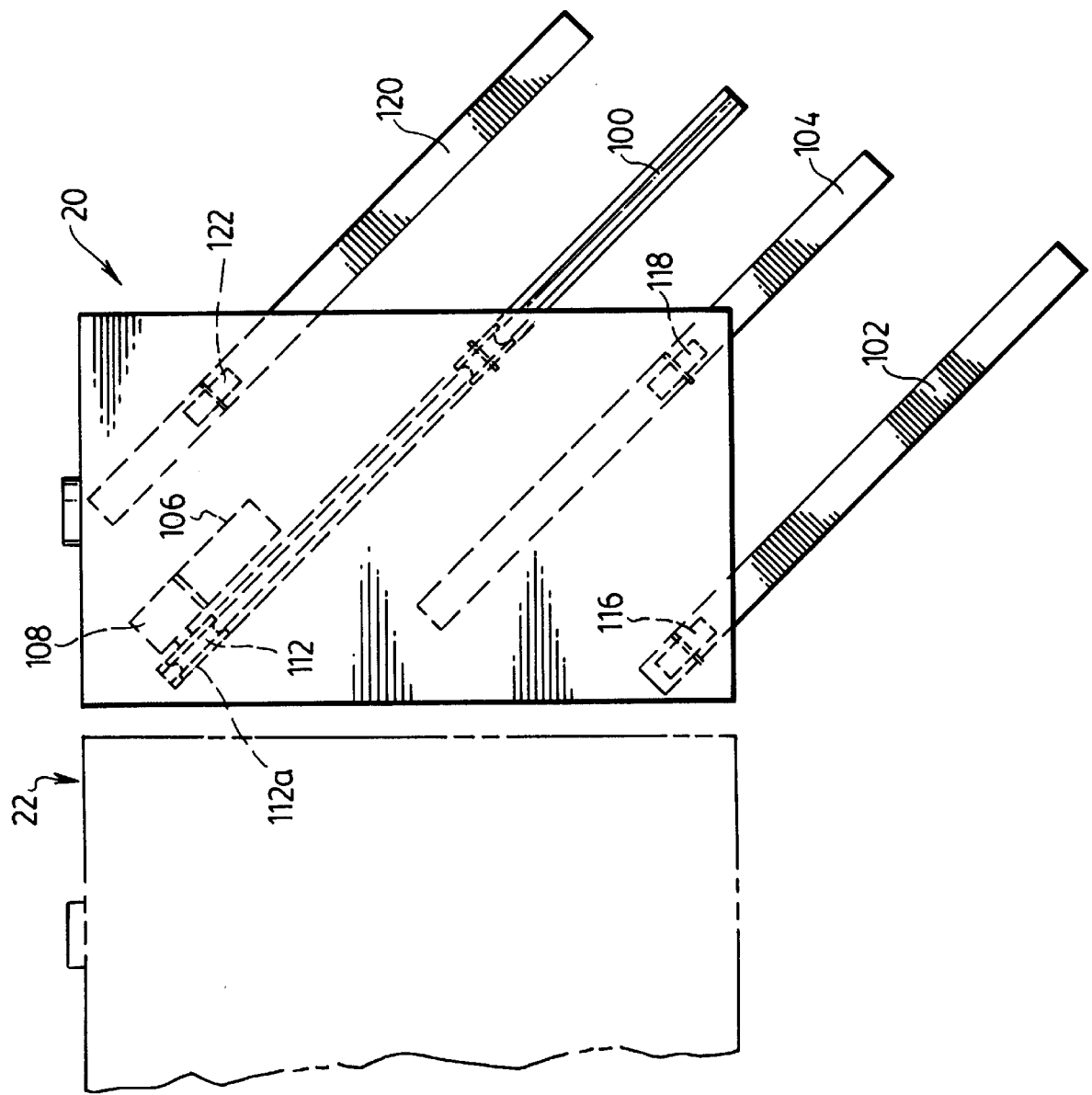
FIG. 7 is a plan view corresponding to part of FIG. 1 illustrating an alternative track arrangement.

FIG. 7 shows an alternative embodiment in which a different configuration of rail and support plates is provided. The components themselves are the same as in FIG. 6 and have therefore been denoted by similar reference numerals. In this case, the position of the rail 100 with respect to the projector is different from the previous embodiment (see FIG. 1), and the two plates 102 and 104 are inwardly of the rail, with an additional plate 120 outwardly of the rail. Casters 116 and 118 run on the plates 102 and 104 respectively and a similar caster 122 runs on plate 120. Again, motor 106 drives a double flanged wheel 112 on rail 100 and platform 160 is provided with a double flanged caster wheel 114 that also runs on the rail. In this embodiment, the drive wheel 112 is positioned adjacent the "leading" end of rail 100 (i.e. the end closest to the projection room wall 30) and the caster 114 is behind that wheel; the arrangement in the embodiment of FIG. 6 is reversed.

It will be understood from this that various different track configurations and drive wheel arrangements may be appropriate for different applications and different projectors.

In summary, the invention addresses the need to position the two projectors as close as possible laterally to each other in their projection positions, to minimize unwanted horizontal offset of the projected images, and at the same time to have provision for unrestricted access to each projector for set up and maintenance.

It will of course be understood that the preceding description relates to particular preferred embodiments of the invention only and that many modifications are possible within the broad scope of the invention. Some of those modifications have been indicated and others will be apparent to a person skilled in the art. As has been indicated previously, it should be noted in particular that the invention is not limited in its application to film projectors but could be used for other forms of image projector. Also, while a motorized transporter drive is preferred, it would be possible to provide a manually operable drive arrangement, or to provide for the projectors to be simply pushed manually along the tracks. In the later case, it would be sufficient to simply provide for wheels on the projector base and an appropriate guide arrangement for defining the transport path.

It should also be noted that while reference has been made to an image projection apparatus comprising two projectors, at least one of which is movable, the invention could also be applied to an apparatus that includes more than two projectors, at least one of which is movable.

We claim:

1. An image projection apparatus comprising:

first and second projectors adapted to be disposed in adjacent side-by-side projection positions for projecting respective sets of images along generally parallel optical axes;

in association with at least said first projector, transport means supporting the projector for movement along a transport path between its said projection position and a retracted position clear of the second projector for permitting access to both projectors for maintenance and set up, said transport path being angled rearwardly and outwardly with respect to the second projector so that the first projector moves rearwardly from its projection position and laterally away from the second projector in moving to said retracted position.

2. An apparatus as claimed in claim 1, wherein said transport means includes a wheeled base supporting said first projector, track means extending between said projection position and said retracted position and defining said transport path, and drive means for moving said base along said track means.

3. An apparatus as claimed in claim 2, wherein said track means includes at least one rail and said drive means includes a driving wheel which engages said rail, and motor means for driving the wheel.

4. An apparatus as claimed in claim 3, wherein said track means also includes at least one floor plate extending parallel to said rail and caster means on said base riding on said plate.

5. An apparatus as claimed in claim 2, wherein said wheeled base comprises a platform having wheels engaging said track means, a frame supporting said projector on said platform, and means for adjusting the angular orientation of the frame and projector with respect to the platform.

6. An apparatus as claimed in claim 1, wherein said projectors are motion picture film projectors, and wherein the apparatus further includes at least one reel unit in association with each projector and film guide means for maintaining a film path between said first projector and its associated reel unit during movement of the first projector between its projection position and its retracted position.

7. An apparatus as claimed in claim 6, wherein said reel unit associated with the first projector is adapted to both supply film to said film projector for projection, and to receive film from the projector after projection, and wherein said film guide means includes an input roller assembly and an output roller assembly, both carried by said projector base, each said assembly including a generally upright arm having at an upper end thereof a leading film guide roller which is rotatable about a horizontal axis and mounted for turning about a upright axis so that said roller can turn to accommodate changes in the angular orientation of the film extending between the projector and reel unit as the projector is moved between its projection position and its retracted position.

8. An apparatus as claimed in claim 7, wherein said generally upright arm has a lower end provided with a roller which is also rotatable about a horizontal axis, the film extending between an outer side of said roller and said leading roller in a film run, and wherein said arm is adjustable angularly with respect to said projector base for maintaining said upright axis vertical and coincident with the plane of the film at the outer side of said roller at the lower end of the generally upright arm.

9. An apparatus as claimed in claim 8, wherein said roller assembly comprises at least one particle transfer roller between the projector and the roller at the lower end of said generally upright arm.

10. A projector transporter for use in an image projection apparatus comprising: first and second projectors adapted to be disposed in adjacent side-by-side projection positions for projecting respective sets of images along generally parallel optical axes;

said transporter comprising, for use in association with at least said first projector, means for supporting said projector for movement along a transport path and track means for defining said path, said track means being adapted extend between said projection position for said first projector and a retracted position clear of the second projector for permitting access to both projectors for maintenance and set up, in an orientation which is angled rearwardly and outwardly with respect to the second projector so that the first projector moves rearwardly from its projection position and laterally away from the second projector in moving to said retracted position.

* * * * *